(12) United States Patent
Durand

(10) Patent No.: US 7,874,333 B2
(45) Date of Patent: Jan. 25, 2011

(54) TREAD FO HEAVY-VEHICLE TIRE HAVING CONNECTING BRIDGES

(75) Inventor: Renaud Durand, Bangkok (TH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 921 days.

(21) Appl. No.: 11/635,147

(22) Filed: Dec. 6, 2006

(65) Prior Publication Data

US 2007/0125467 A1  Jun. 7, 2007

(30) Foreign Application Priority Data

Dec. 6, 2005  (FR)  ................................... 05 12547

(51) Int. Cl.
  *B60C 11/13*  (2006.01)
(52) U.S. Cl. ............................. 152/209.22; 152/209.25; 152/209.27; 152/DIG. 3; 152/902
(58) Field of Classification Search ............ 152/209.18, 152/209.22, 209.25, 209.27, DIG. 3, 902
  See application file for complete search history.

(56) References Cited

U.S. PATENT DOCUMENTS

| | | | | |
|---|---|---|---|---|
| 3,570,571 | A * | 3/1971 | Riches | 152/209.27 |
| 5,316,062 | A * | 5/1994 | Lurois | 152/209.22 |
| 5,679,186 | A * | 10/1997 | Tagashira et al. | 152/DIG. 3 |
| 5,814,169 | A * | 9/1998 | Yamaguchi et al. | 152/209.22 |
| 6,415,834 | B1 | 7/2002 | Carra et al. | |
| 7,025,100 | B2 * | 4/2006 | Kimishima | 152/209.22 |
| 2006/0169376 | A1 * | 8/2006 | Sundkvist et al. | 152/209.22 |

FOREIGN PATENT DOCUMENTS

| | | | |
|---|---|---|---|
| EP | 0 841 199 A | | 5/1998 |
| JP | 654365 | * | 5/1995 |
| JP | 08-183312 | * | 7/1996 |
| JP | 11-278016 A | | 10/1999 |
| JP | 2003-118320 A | | 4/2003 |
| JP | 2005-126007 | * | 5/2005 |
| JP | 2005-280457 A | | 10/2005 |

* cited by examiner

*Primary Examiner*—Steven D Maki
(74) *Attorney, Agent, or Firm*—Cohen Pontani Lieberman & Pavane LLP

(57) ABSTRACT

A tread (1) comprising a plurality of grooves of longitudinal and transverse general orientation (2*b*, 2*c*, 31, 32), the grooves of longitudinal orientation comprising main grooves (2*b*, 2*c*) of depth G and secondary grooves (31, 32) of depth G' less than the depth G of the main grooves, the central part (C) of the tread, defined axially by two grooves of longitudinal orientation, and of a width of between 0.25 and 0.5 times the width W of the tread, being provided with at least one main groove (2*c*) of longitudinal orientation and of average depth G. The depth G' of the secondary grooves (31, 32) is between 0.4 and 0.6 times the depth G of the main grooves (2*b*, 2*c*). The transverse grooves (5*c*) of the ribs of the central part (C) comprise over at most half of their length a connecting bridge (6*c*), the surface radially to the outside of which is at a distance Hc from the running surface of between 0.4 and 0.8 times the depth G of the main grooves. The transverse grooves (5*b*) of the ribs of each edge (B) comprise over at most half of their length a connecting bridge (6*b*) which prevents closure of said transverse grooves. The surface radially to the outside is at a distance Hs from the running surface which is at most equal to 0.3 times the depth G of the main grooves.

6 Claims, 2 Drawing Sheets

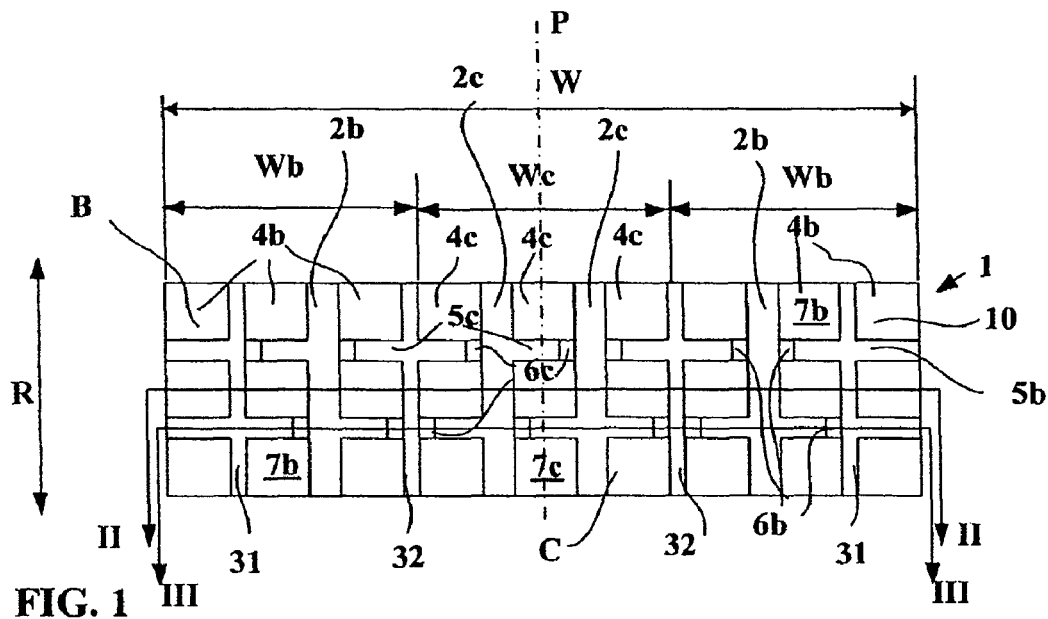
FIG. 1
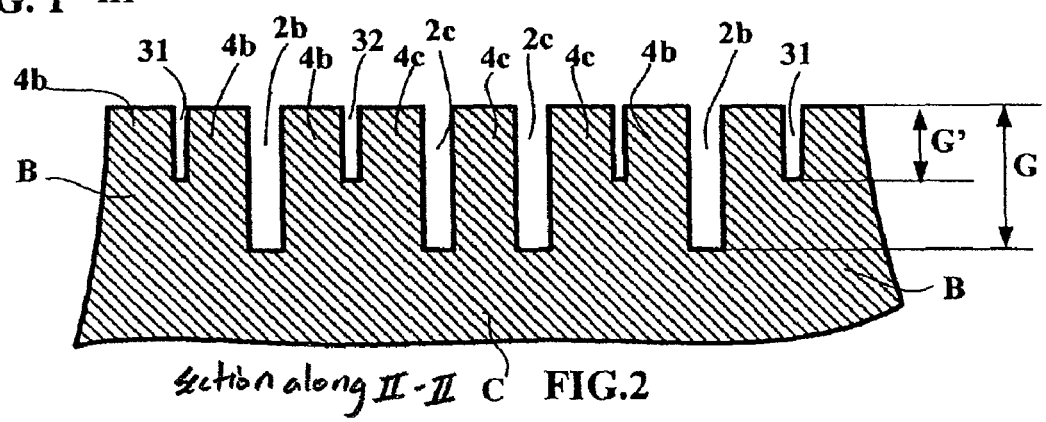
section along II-II  FIG. 2
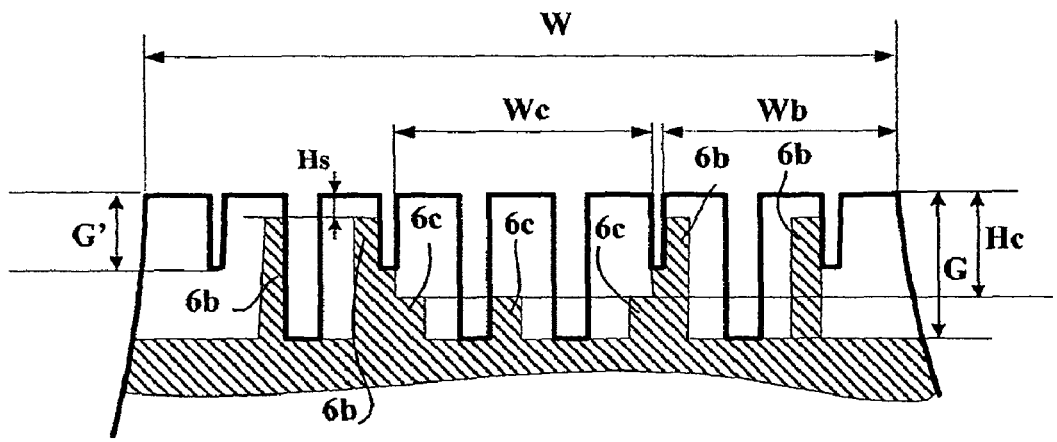
section along III-III  FIG. 3

TREAD FO HEAVY-VEHICLE TIRE HAVING CONNECTING BRIDGES

FIELD OF THE INVENTION

The present invention relates to tires having a running surface intended to come into contact with the roadway, this running surface being provided with main grooves, longitudinal secondary grooves and transverse indentations to form a tread pattern the relative dimensions of which are given.

More specifically, the present invention relates to tires for heavy vehicles intended for winter use on snow-covered roads and also having satisfactory performance on normal roads.

BACKGROUND OF THE INVENTION

In heavy-vehicle tires intended for winter use on snow-covered roads, it is known to form on the tread of said tires tread patterns the grooves and incisions of which have depths greater than those used for tires for use on non-snow-covered roads (tires for summer use, for example).

By forming a large number of grooves of great depth and incisions in large numbers and of the same depth, a tire is generally obtained, the tread of which exhibits reductions in structural rigidity which very substantially reduce the gains provided by the very presence of these grooves and incisions on the snow. These deficiencies are found particularly in winter conditions and in particular when starting off on a snow-covered slope and in a cornering configuration on snow and/or ice.

SUMMARY OF THE INVENTION

One object of the invention is to provide a tread pattern with a design rule suitable for a tire tread fitted on a heavy vehicle which is intended to travel on roads which are at least partly snow-covered and which does not have the drawbacks of conventional winter tread patterns.

Of course, such a design rule will integrate the fact that the tread pattern must be of high performance on snow for a major part of its use, that is to say up to approximately half of the wear of the tread.

DEFINITIONS

Equatorial plane: plane perpendicular to the axis of rotation of the tire and dividing the tire into two substantially equal halves.

Meridian plane: plane containing the axis of rotation of the tire.

Radial direction: direction perpendicular to the axis of rotation.

Transverse or axial direction: direction parallel to the axis of rotation.

Circumferential or longitudinal direction: direction perpendicular to a meridian plane and tangential to the running surface of the tread of a tire.

Connecting bridge in a groove: element of material between the two walls defining said groove, the function of which is to prevent these walls from moving towards each other.

An embodiment of the invention provides a tread pattern for tires comprising an outer surface forming a running surface of width W and intended to come into contact with the roadway during travel. This tread pattern is formed by elements in relief defined by a plurality of grooves of longitudinal (that is to say in the circumferential direction on the tire) and transverse (that is to say axial on the tire) general orientation, the grooves of longitudinal orientation comprising main grooves of depth G and secondary grooves of depth G' less than the depth G of the main grooves, this tread pattern comprising a central part and edges axially on either side of the central part. The central part, limited axially by two grooves of longitudinal orientation, has a width of between 0.25 and 0.5 times the width W of the tread and is provided with at least one main groove of longitudinal orientation and of average depth G.

Each edge is provided with at least two grooves of longitudinal orientation; the distribution of the longitudinal grooves from the equatorial plane towards the edges is such that the main grooves and the secondary grooves are arranged alternately. Each pair of longitudinal grooves defines ribs, the latter being provided with a plurality of transverse grooves having a depth equal to the depth G of the main grooves.

This tread is characterized in that:
the depth G' of the secondary grooves is of between 0.4 and 0.6 times the depth G of the main grooves;
the transverse grooves of the ribs of the central part comprise over at most half of their length a connecting bridge the surface radially to the outside of which is at a distance Hc from the running surface of between 0.4 and 0.8 times the depth G of the main grooves;
the transverse grooves of the ribs of each edge comprise over at most half of their length a connecting bridge which prevents closure of said transverse grooves; the surface radially to the outside is at a distance Hs from the running surface which is at most equal to 0.3 times the depth G of the main grooves.

Preferably, the connecting bridges of the transverse grooves of one and the same rib are arranged such that one of their lateral faces is continuous with one of the lateral faces of said rib.

In another preferred variant, the tire tread according to the invention comprises for at least one rib connecting bridges arranged alternately, that is to say on one side of the rib then on the other side of said rib.

Advantageously, the transverse grooves are inclined and form an average angle at least equal to 3 degrees and at most equal to 15 degrees.

BRIEF DESCRIPTION OF THE DRAWINGS

FIG. 1 shows a partial plan view of the running surface of a tread according to the invention;

FIG. 2 shows a view in section along the line II-II of FIG. 1 and shows the tread in its thickness;

FIG. 3 shows another sectional view along the line III-III of the tread of FIG. 1;

DETAILED DESCRIPTION OF THE DRAWINGS

Figure 4:
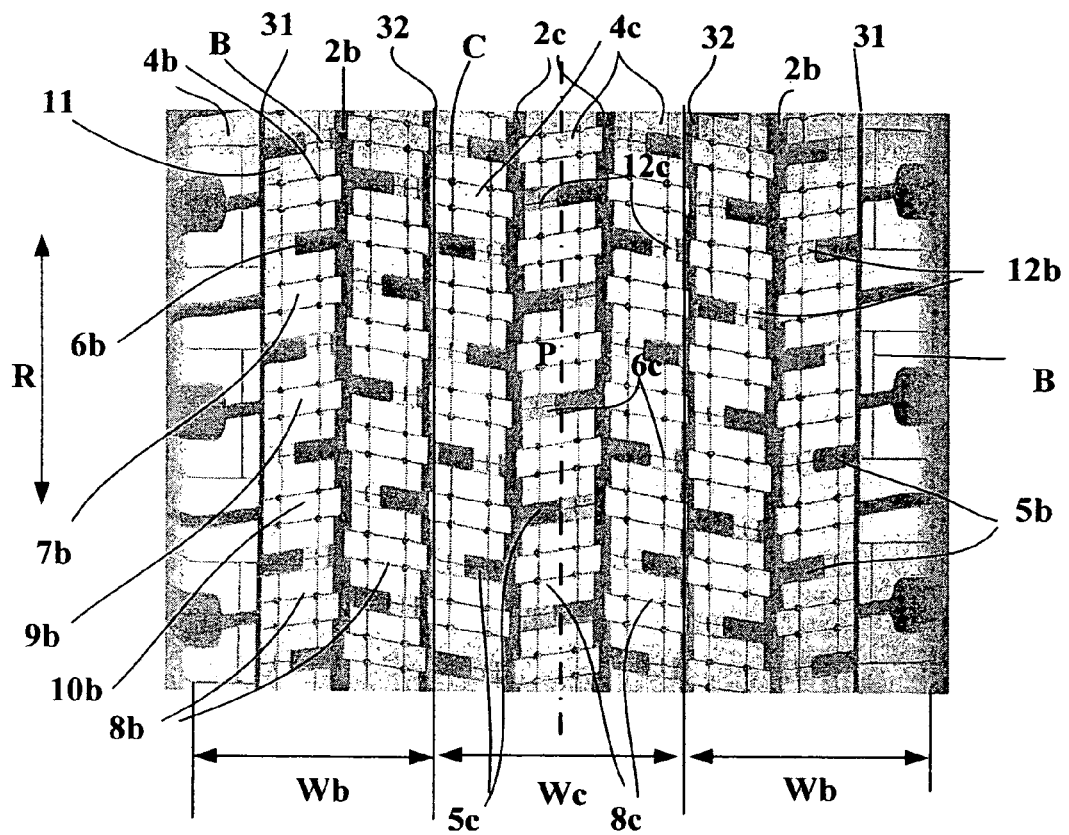
FIG. 4 shows a variant of a tread pattern according to the invention.

FIG. 1 shows the running surface 10 of a tread pattern of a tread 1 according to the invention of a tire of dimension 11 R 22.5. The width of this tread, W, here is equal to 240 mm. This tread pattern comprises four main grooves 2b, 2c of circumferential orientation, the average depth G of which is equal to 19 mm and the average width of which is equal to 7 mm (measured on the new tire provided with said tread). The width W of the tread is measured as the width of the imprint on flat ground of a tire mounted on its rated rim, subjected to its rated conditions of use (rated inflation pressure and load) as defined in the E.T.R.T.O. standard.

Four secondary grooves 31, 32 are formed on this tread, the axially outermost two grooves 31 having a width substantially equal to 2 mm and the other two grooves 32 having a width substantially equal to 5 mm; these four secondary grooves have a depth G' equal to 11 mm.

This tread comprises a central part C of width Wc of between 25% and 50% of the width W of the tread and in the present case equal to 80 mm (or approximately 33% of the width W). This central part C is defined axially by the two axially innermost secondary grooves 32. Axially to the outside of the central part C and on either side, there are edge parts B in the present case of the same width Wb. The two secondary grooves 32 defining the central part C define axially to the inside said edge parts B.

The central part comprises two circumferential main grooves 2c to form on this central part three circumferential ribs 4c of a width equal to 22 mm.

Each edge part B of the tread comprises two circumferential grooves, a main groove 2b and a secondary groove 31. The arrangement of the circumferential grooves, starting from the equatorial plane P and moving towards one or the other of the edges of the tread, is such that the main and secondary grooves succeed one another in alternation (in this alternation, the secondary groove 32 between the central part C and an edge part B is taken into account). The edges B each comprise three ribs 4b of a width equal to 22 mm.

On each rib 4c of the central part C, there is formed a plurality of grooves 5c of transverse orientation as can be seen in FIG. 1 and complementarily in FIGS. 2 and 3, which each depict sections of FIG. 1. Likewise, each rib 4b of the edges B comprises a plurality of transverse grooves 5b. All the transverse grooves 5b, 5c in the present example are formed on the different ribs so as to be in one and the same radial plane (that is to say without an offset between them in the circumferential direction). The transverse grooves have a width equal to 7 mm.

Preferably, the bridges (6b, 6c) are arranged so as to be on one of their faces in continuity with one of the faces of the rib on which they are formed.

FIG. 2 depicts a section through the tread shown in FIG. 1 along a section plane II-II. In this FIG. 2, it can be seen that the central part between the two secondary grooves 32 axially closest to one another and located on either side of the equatorial plane P comprises three ribs 4c: the rib centered on the equatorial plane P being delimited by two main grooves 2c of depth G, whereas the other two ribs of the central part C are delimited by a main groove 2c and a secondary groove 32.

Likewise, each edge part B of the tread is divided into three ribs 4b each defined by a main groove 2b and a secondary groove 31, 32, with the exception of the axially outermost rib. All the transverse grooves 5b, 5c form, respectively, blocks 7b, 7c on the ribs 4b, 4c.

FIG. 3 shows a section along the section plane III-III of FIG. 1. It can be seen that the transverse grooves 5c of the central part C of a width equal to 22 mm have a depth of 19 mm (equal to the depth of the main longitudinal grooves). These grooves comprise over 45% (10 mm: 22 mm) of their length a connecting bridge 6c which connects the blocks 7c on either side of this bridge. The surface radially to the outside of the connecting bridges 6c is located beneath the running surface 10 at a distance Hc of between 0.4 and 0.8 times the depth G of the main grooves and in the present case at 11 mm from the running surface when new.

On the edge parts B, the transverse grooves 5b are arranged so as to be aligned with the transverse grooves 5c of the central part C. These transverse grooves 5b of the edges B exhibit the same geometric characteristics of depth and width as the transverse grooves 5c of the central part; they comprise, over at most half of their length, a connecting bridge 6b which prevents closure of said transverse grooves 5b, the surface radially to the outside of said bridges is at a distance Hs from the running surface 10 which is at most equal to 0.3 times the depth G of the main grooves (in the present case this distance is equal to 1 mm).

In the variant shown in FIG. 4, there are substantially the same main 2b, 2c and secondary 31, 32 grooves as in the first variant. A first difference lies in the fact that the transverse grooves 5b, 5c no longer coincide over all the ribs 4b, 4c. The transverse grooves of two adjacent ribs are offset in the circumferential direction so as not to be in one and the same meridian section plane.

Furthermore, each transverse groove 5b, 5c has an average inclination relative to the axial direction (direction perpendicular to the direction of travel indicated by the arrow R in FIG. 4) which is other than 0° and in the present case equal to 15°. The transverse grooves 5c of a given rib 4c have the same orientation; from a rib 4c to an other rib 4c, the orientations of the transverse grooves 5c are opposite. On the ribs of the edge parts B the same applies with the exception of the axially outermost rib.

Finally, each block 7b, 7c between two transverse grooves 5b, 5c, and with the exception of the axially outermost ribs, is provided with two incisions 8b, 8c the traces of which on the running surface 10 are parallel to the average direction of the transverse grooves 5b, 5c defining said blocks 7b, 7c. These incisions 8b, 8c have a depth of 11 mm (preferably, the depth of these incisions must be at least equal to 0.4 times the depth G of the main grooves and at most to 0.6 times the same depth G). Furthermore, all the blocks 7b, 7c are provided with two longitudinal incisions 11 intersecting the transverse incisions 8b, 8c; these longitudinal incisions 11 have a depth of 0.3 mm (preferably at most equal to 2% of the depth G of the main grooves 2b, 2c).

Furthermore, the transverse incisions 8b, 8c, on one and the same block, define a lamella of material, the lateral faces of which are axially to the outside of the lateral faces of the other lamellae of the same block.

To limit the reduction in mechanical rigidity of the tread, the faces of material defining the incisions 8b, 8c comprise motifs in relief to enable one face to be blocked relative to the other. In this manner, the number of ridges of material in contact with the ground in the contact area of the tire is increased while limiting the loss of rigidity of the tread pattern elements.

Finally, each connecting bridge 6b, 6c is provided with an incision 12b, 12c substantially parallel to the transverse groove in which said bridge is formed.

Advantageously, this tire tread is such that the distance between two transverse grooves 5b, 5c of one and the same rib 4b, 4c is at most equal to three times the average width of said rib. In the case illustrated, the distance between two transverse grooves, be it on the ribs of the edge or of the central part, is equal to 26 mm.

Figure 5A:
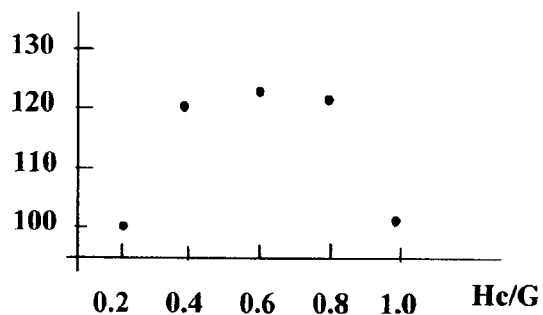
FIGS. 5A and 5B show results of measurements for tread pattern variants.

The tire described was subjected to comparative tests with a tire of similar dimension provided with a conventional winter tread pattern (11 R 22.5 XDW ICE GRIP). In the test of drive ability on snow, a heavy vehicle, fitted with tires to be tested on the driving and steering axles, is at a standstill on a snow-covered road, the gradient of which is between 0 and 5%. The drive ability test consists of measuring the longitudinal acceleration for the different tires tested (the greater the acceleration, the better is the performance). The tires according to the invention made it possible to improve the performance of the tires taken as reference by 20 to 50%. FIG. 5A shows the drive ability reading points (the greater the value on the vertical axis of the graph shown, the better is the performance; the deviations are expressed as percent) for tires having a ratio Hc/G which varies between 0.2 and 1.0. It will be noted that for values of Hc/G of between 0.4 and 0.8 the level of longitudinal performance is optimum.

Figure 5B:
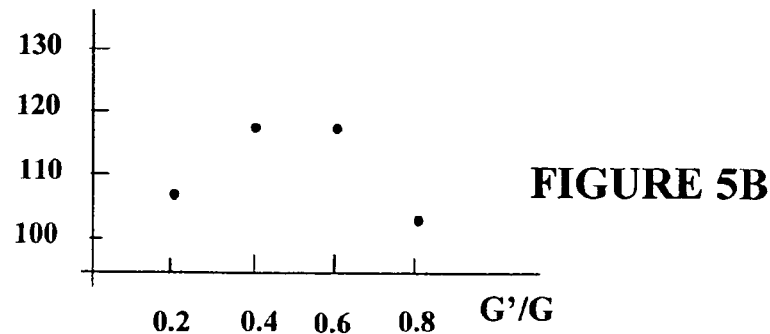

In another test, the "transverse" performance of the tires is compared. To this end, the variation of angle to be imparted to the steering-wheel in order to pass into a bend of given radius and also any angular corrections are measured (the smaller the angle, the better is the performance; the lesser the corrections, the better is the performance). In FIG. 5B, it will be noted that the tires of the invention improve the transverse performance (the greater the value on the vertical axis of the graph shown, the better is the performance) by the order of 10% for tires having a ratio G'/G which varies between 0.2 and 1.0.

The invention claimed is:

1. A tread for tires comprising an outer surface forming a running surface of width (W) and intended to come into contact with a roadway during travel, this tread comprising a tread pattern formed by elements in relief defined by a plurality of grooves of longitudinal (circumferential on the tire) and transverse (or axial on the tire) general orientation, the grooves of longitudinal orientation comprising main grooves of depth G and secondary grooves of depth G' less than the depth G of the main grooves, this tread pattern comprising a central part (C) and edges (B) axially on either side of the central part, said central part (C), defined axially by two grooves of longitudinal orientation, and of a width of between 0.25 and 0.5 times the width W of the tread, being provided with at least one main groove (2c) of longitudinal orientation and of average depth G, wherein two innermost grooves of the central part (C) are of depth G, each edge (B) being provided with at least two grooves of longitudinal orientation, the distribution of the longitudinal grooves from the equatorial plane towards the edges being such that the main grooves and the secondary grooves are arranged alternately, each pair of longitudinal grooves defining ribs provided with a plurality of transverse grooves of a depth equal to the depth G of the main grooves, the two innermost grooves of the central part (C) defining a single rib centered on an equatorial plane (P) of the tread, wherein the depth G' of the secondary grooves is between 0.4 and 0.6 times the depth G of the main grooves;

wherein the transverse grooves of the ribs of the central part (C) comprise over at most half of their length a connecting bridge the surface radially to the outside of which is at a distance Hc from the running surface of between 0.4 and 0.8 times the depth G of the main grooves; and wherein the transverse grooves of the ribs of each edge (B) comprise over at most half of their length a connecting bridge which prevents closure of said transverse grooves, the surface radially to the outside is at a distance Hs from the running surface which is at most equal to 0.3 times the depth G of the main grooves.

2. The tire tread according to claim 1, wherein for each rib, the bridges are arranged so as to be, on one of their faces, in continuity with one of the faces of said rib.

3. The tire tread according to claim 2, wherein for at least one rib, the bridges are arranged toward alternate sides of the at least one rib in a direction perpendicular to the equatorial plane (P).

4. The tire tread according to claim 3, wherein the transverse grooves are inclined relative to the axial direction at an angle at most equal to 15 degrees.

5. The tire tread according to claim 1, wherein the distance between two transverse grooves of one and the same rib is at most equal to three times the average width of said rib.

6. The tire tread according to claim 5, wherein each tread pattern element defined by longitudinal grooves and transverse grooves is provided with at least one incision of transverse orientation opening into the longitudinal grooves, these incisions of transverse orientation having an average depth of between 0.4 and 0.6 times the depth G of the main grooves.

* * * * *